US007379385B2

(12) United States Patent
Ferber (10) Patent No.: US 7,379,385 B2
(45) Date of Patent: May 27, 2008

(54) PROCESSING OF SEISMIC DATA ACQUIRED USING OVER/UNDER STREAMERS AND/OR OVER/UNDER SOURCES

(75) Inventor: Ralf Ferber, Horsham (GB)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 11/459,958

(22) Filed: Jul. 26, 2006

(65) Prior Publication Data
US 2008/0025147 A1 Jan. 31, 2008

(51) Int. Cl.
*G01V 1/38* (2006.01)
*G01V 1/00* (2006.01)
(52) U.S. Cl. .......................................... 367/20; 367/57
(58) Field of Classification Search ................. 367/20, 367/57–58; 114/242
See application file for complete search history.

(56) References Cited

U.S. PATENT DOCUMENTS

| 4,254,480 | A | * | 3/1981 | French ........................ 367/58 |
| 5,253,217 | A | * | 10/1993 | Justice et al. ................. 367/46 |
| 5,253,219 | A | * | 10/1993 | Houston et al. .............. 367/79 |
| 5,469,404 | A | * | 11/1995 | Barber et al. ................. 367/23 |
| 5,581,514 | A | * | 12/1996 | Moldoveanu et al. ......... 367/16 |
| 6,256,589 | B1 | * | 7/2001 | Gallotti Guimaraes ....... 702/18 |
| 6,775,618 | B1 | * | 8/2004 | Robertsson et al. .......... 702/14 |
| 6,894,949 | B2 | * | 5/2005 | Aronstam ..................... 367/57 |
| 6,996,471 | B2 | * | 2/2006 | Ferber ......................... 702/17 |
| 2005/0219948 | A1 | * | 10/2005 | Naess .......................... 367/20 |
| 2005/0265122 | A1 | * | 12/2005 | Grion .......................... 367/21 |
| 2006/0203611 | A1 | * | 9/2006 | Robertsson et al. .......... 367/13 |
| 2006/0215489 | A1 | * | 9/2006 | Solheim et al. .............. 367/20 |
| 2006/0227657 | A1 | * | 10/2006 | Tveide et al. ................. 367/16 |
| 2006/0256654 | A1 | * | 11/2006 | Paulsen ....................... 367/20 |

OTHER PUBLICATIONS

Hagras et al. The Over/Under Acquisitin Test-Taking the Seismic to the Technical Limits. Cairo 2002: Ancient Oil-New Energy. 2002.*
Amundsen et al. Recent Advances in Technology: Excorcising the Ghosts—the New Streamer Technology Launched by PGS. Geo ExPro. Sep. 2007. pp. 78-80.*
Molodveanu et al. Over/under towed-streamer acquistion: A method to extend seismic bandwidth to both higher and lower frequencies. The Leading Edge. Jan. 2007. pp. 41-58.*
Amundsen, 1993, Wavenumber-based filtering of marine point-source data, Geophysics, 58, pp. 1335-1348.
Mon,k 1990, Wavefield separation of twin streamer data, First Break, 8, 3.
Posthumus, 1993, Deghosting using twin streamer configuration, Geophysical Prospecting, 41 pp. 267-286.

* cited by examiner

*Primary Examiner*—Deandra M Hughes
(74) *Attorney, Agent, or Firm*—Ari Pramudji; Liangang (Mark) Ye; Jeffrey E. Griffin

(57) ABSTRACT

Implementations of various techniques for processing seismic data acquired by three or more over/under streamers. In one implementation, the seismic data may be processed by grouping the seismic data into one or more sets of seismic data based on all possible pairs of the three or more over/under streamers, wherein each set of seismic data comprises seismic data that had been acquired by a pair of the three or more over/under streamers, applying a shift and subtract algorithm to the one or more sets of seismic data, and applying a dephase and sum algorithm to the one or more sets of seismic data.

24 Claims, 8 Drawing Sheets

PROCESSING OF SEISMIC DATA ACQUIRED USING OVER/UNDER STREAMERS AND/OR OVER/UNDER SOURCES

BACKGROUND

1. Field of the Invention

Implementations of various technologies described herein generally relate to seismic data processing, and more particularly, processing seismic data acquired using over/under streamers.

2. Description of the Related Art

The following descriptions and examples are not admitted to be prior art by virtue of their inclusion within this section.

Seismic exploration is widely used to locate and/or survey subterranean geological formations for hydrocarbon deposits. Since many commercially valuable hydrocarbon deposits are located beneath bodies of water, various types of marine seismic surveys have been developed. In a typical marine seismic survey, seismic streamers are towed behind a survey vessel. The seismic streamers may be several thousand meters long and contain a large number of sensors, such as hydrophones, geophones, and associated electronic equipment, which are distributed along the length of the seismic streamer cable. The survey vessel may also include one or more seismic sources, such as air guns and the like.

As the seismic streamers are towed behind the survey vessel, acoustic signals, commonly referred to as "shots," produced by the one or more seismic sources are directed down through the water into strata beneath the water bottom, where they are reflected from the various subterranean geological formations. Reflected signals are received by the sensors, digitized, and then transmitted to the survey vessel. The digitized signals are referred to as "traces" and are recorded and at least partially processed by a signal processing unit deployed on the survey vessel. The ultimate aim of this process is to build up a representation of the subterranean geological formations beneath the streamers. Analysis of the representation may indicate probable locations of hydrocarbon deposits in the subterranean geological formations.

The seismic streamers may be in an over/under configuration, i.e., one set of streamers being suspended above another set of streamers. Streamers in an over/under configuration may be towed much deeper than streamers in a conventional single configuration.

Conventional techniques for processing seismic data acquired by streamers in a twin over/under configuration generally involve a dephase and sum algorithm and a shift and subtract algorithm. In the application of the dephase and sum algorithm, the data recorded at each streamer may be first processed by a correlation step to dephase the individual surface ghost wavelets. However, this requires explicit knowledge of the surface ghost wavelet, which is typically very difficult to obtain. Hence, the surface ghost wavelet is typically assumed to be that of a flat sea-surface, which renders conventional techniques useless in rough sea conditions.

In the application of the shift and subtract algorithm, the data recorded on one of the twin over/under streamers may be time shifted so that the free-surface ghost energy occurs at the same time on both streamers. Subtraction of one data set from the other may remove this ghost energy. Such shift and subtract algorithms, however, may leave a ghost of the up going wave fields in the processed data. This ghost may not easily be removed due to its spectral notches.

SUMMARY

Described herein are implementations of various technologies for processing seismic data acquired by three or more over/under streamers. In one implementation, the seismic data may be processed by grouping the seismic data into one or more sets of seismic data based on all possible pairs of the three or more over/under streamers, wherein each set of seismic data comprises seismic data that had been acquired by a pair of the three or more over/under streamers, applying a shift and subtract algorithm to the one or more sets of seismic data, and applying a dephase and sum algorithm to the one or more sets of seismic data.

Described herein are also implementations of various technologies for a computer system, which may include a processor and a memory comprising program instructions executable by the processor to: group seismic data acquired by at least one of three or more over/under streamers and three or more over/under sources into one or more sets of seismic data based on all possible pairs of the at least one of the three or more over/under streamers and three or more over/under sources, wherein each set of seismic data comprises seismic data that had been acquired by a pair of the at least one of the three or more over/under streamers and three or more over/under sources, apply a shift and subtract algorithm to the one or more sets of seismic data to generate one or more sets of simulated seismic data, wherein each set of simulated seismic data comprises seismic data that would have been acquired by one of a simulated single streamer and a simulated single source disposed at a depth equivalent to a vertical distance between one of the pair of the at least one of the three or more over/under streamers and three or more over/under sources and the other one of the pair of the at least one of the three or more over/under streamers and three or more over/under sources and that would have been acquired in a calm sea having a flat surface, and apply a dephase and sum algorithm to the one or more sets of simulated seismic data.

Described herein are also implementations of various technologies for processing seismic data acquired by three or more over/under sources. In one implementation, the seismic data may be processed by grouping the seismic data into one or more sets of seismic data based on all possible pairs of the three or more over/under sources, wherein each set of seismic data comprises seismic data that had been acquired by a pair of the three or more over/under sources, applying a shift and subtract algorithm to the one or more sets of seismic data, and applying a dephase and sum algorithm to the one or more sets of seismic data.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

As mentioned above, conventional techniques for processing seismic data acquired using streamers in a twin over/under configuration generally involve an alignment of the down going wave fields to remove the surface ghost, which is the down-going wave after reflection of the up-going wave at the sea-surface, at the price of introducing a simulated (or pseudo) ghost dependent on the vertical separation of the twin over/under streamers. This simulated ghost may be dephased. An additional data set with a different simulated ghost for ghost attenuation via dephasing and sum may be needed. At least one additional streamer in vertical over/under configuration may be used to provide this additional data set. Accordingly, implementations of various techniques described herein are configured to apply the shift and subtract algorithm and the dephase and sum algorithm to seismic data acquired using an over/under streamer configuration having three or more sets of streamers, each set being disposed at a different depth. The shift and subtract algorithm may be configured to remove rough sea surface perturbations from the recorded seismic data, thereby simulating seismic over/under data without such perturbations. The dephase and sum algorithm may be configured to remove the simulated ghost wavelets from the simulated seismic data. In one implementation, once processed, recorded seismic data from the three or more over/under streamers may be converted to seismic data that would have been acquired with a single streamer in a totally calm sea and that would include only data from up going wave fields. The single streamer may be disposed at arbitrary depth, such as at zero depth or at the depth of the shallowest streamer of the over/under configuration.

Figure 1:
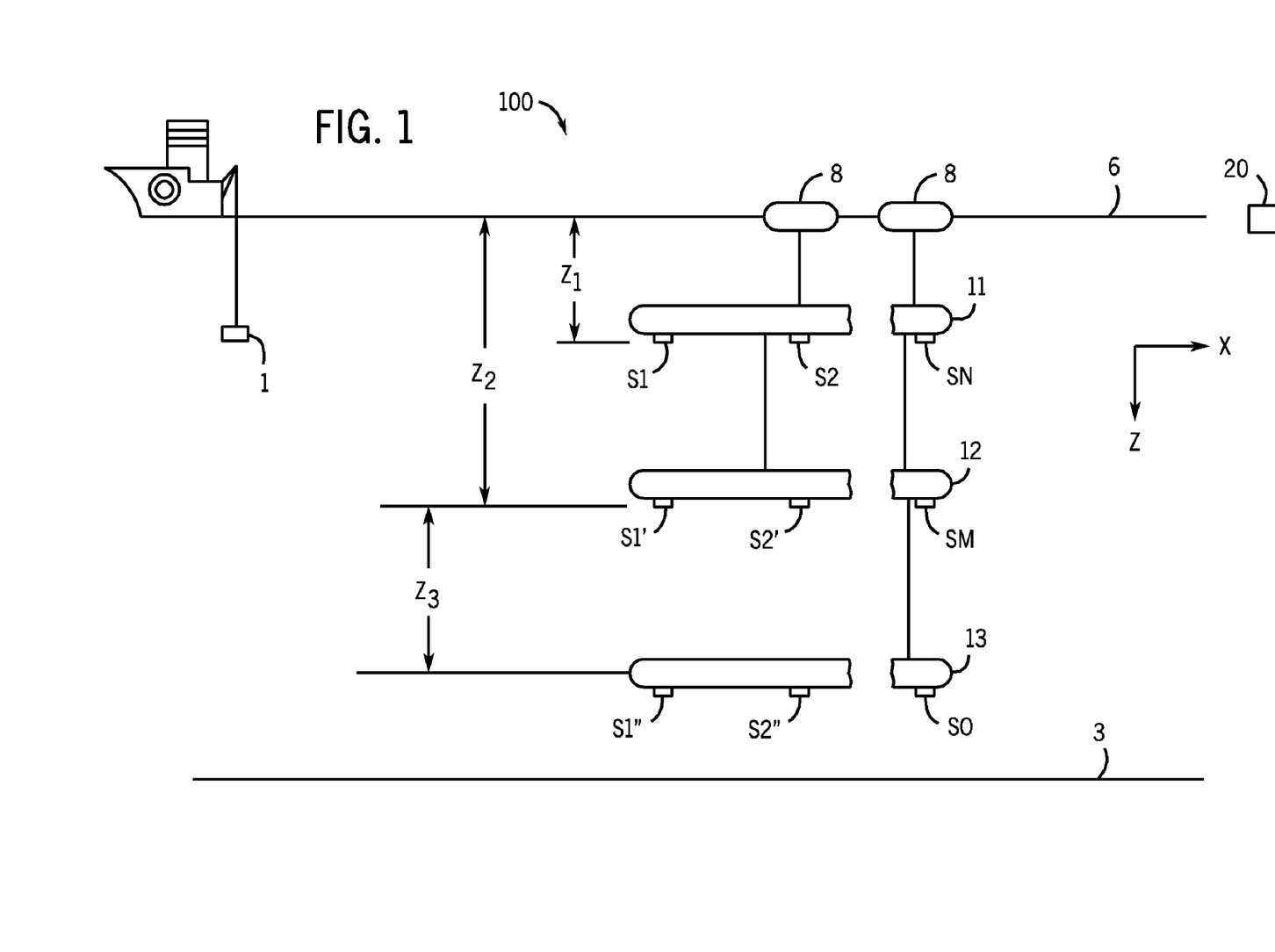
FIG. 1 illustrates a schematic diagram of a marine seismic survey in accordance with implementations of various techniques described herein.

FIG. 1 illustrates a schematic diagram of a marine seismic survey 100 in accordance with implementations of various techniques described herein. In one implementation, the marine seismic survey 100 may include a source array 1 configured to emit seismic energy. Although only one source array 1 is illustrated in FIG. 1, it should be understood that more than one source array may be used in implementations of various techniques described herein.

The marine seismic survey 100 may further include a first streamer 11, a second streamer 12 and a third streamer 13, which are suspended within a water column at different depths below the surface of the sea 6. The third streamer 13 may be suspended below the second streamer 12. The second streamer 12 may be suspended below the first streamer 11. The second streamer 12 and the third streamer 13 may be deployed to be nominally vertically below the first streamer 11. However, the action of tides and currents may prevent the second streamer 12 and the third streamer 13 to be exactly vertically below the first streamer 11. The streamers may be deployed such that the first streamer 11 is deployed at a nominal depth $Z_1$ below the surface 6 of the sea, the second streamer 12 is deployed at a nominal depth $Z_2$ below the surface 6 of the water column and the third streamer 13 is deployed at a nominal depth $Z_3$, where $Z_3 > Z_2 > Z_1$. However, the action of tides and currents and the effect of surface waves may cause the separation between the streamers to vary from the intended value, e.g., $Z_2-Z_1$. This arrangement may be referred to as an over/under combination of the streamers. The term "over" is typically associated with the shallower streamers, e.g., the first streamer 11, and the term "under" is typically associated with the deeper streamers, e.g., the second streamer 12. Although only three streamers are shown on FIG. 1, it should be understood that more than three over/under streamers may be used in implementations of various techniques described herein. In addition, it should further be understood that in some implementations, multi vertical over/under sources may be used in lieu of or in combination with multi over/under streamers.

A plurality of pressure sensors may be disposed along each streamer, with the first streamer 11 having pressure sensors S1, S2 . . . SN up to a total of N pressure sensors, the second streamer 12 having pressure sensors S1', S2' . . . SM up to a total of M pressure sensors and the third streamer 13 having pressure sensors S1", S2" . . . SO up to a total of O pressure sensors. Each streamer may have the same number of pressure sensors, i.e., N=M=O. Although the streamers have been described as having pressure sensors disposed thereon, it should be understood that in some implementations the streamers may have other types of receivers, such as particle velocity sensors and the like. The streamers may be suspended from one or more floats 8 so that all the pressure sensors of one streamer may be at substantially the same depth in a flat sea.

The marine seismic survey 100 may further include a processing apparatus 20 for processing seismic data acquired by the pressure sensors on the streamers 11, 12, 13 as a result of actuating the source array 1 to emit seismic energy. The processing apparatus 20 may be located, for example, on shore, on the towing vessel, or on another vessel. Data acquired at the sensors on the streamers may be transmitted to a storage means, e.g., located on the towing vessel, by a communication means, e.g., an electrical, optical or wireless link, and may subsequently be passed to the processing apparatus 20. Alternatively, data acquired at the sensors may be stored for subsequent retrieval in storage means provided on the streamers. The processing apparatus 20 may be described in more detail with reference to FIG. 8.

The source array 1 may be an array of airguns or any other type of emitters, such as marine vibrator units and the like. Energy emitted from the source array 1 may be reflected by the seabed 3 or by other reflectors (not shown) below the seabed 3 and may then be detected by the pressure sensors on the streamers 11, 12 and 13.

Figure 2:
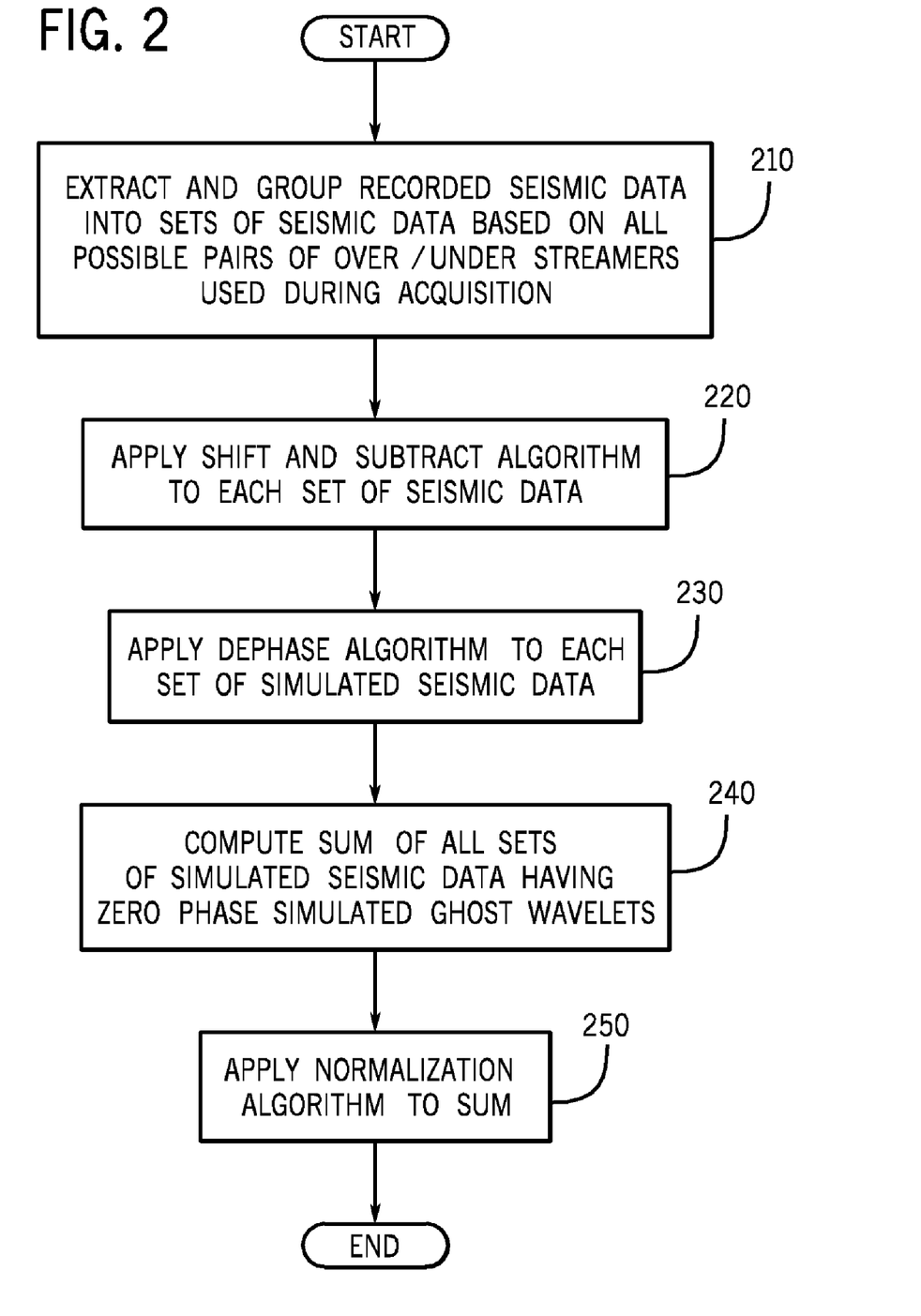
FIG. 2 illustrates a flow diagram of a method for processing seismic data in accordance with implementations of various techniques described herein.

FIG. 2 illustrates a flow diagram of a method 200 for processing seismic data in accordance with implementations of various techniques described herein. In one implementation, the seismic data may be acquired using a marine seismic survey having a triple over/under streamer configuration, such as the one described in FIG. 1. Although various implementations are described with reference to seismic data acquired using a triple over/under streamer configuration, it should be understood that in some implementations the seismic data may be acquired by an over/under streamer configuration having more than three streamers at various depths.

At step 210, the recorded seismic data may be extracted and grouped into sets of seismic data based on all the possible pairs of over/under streamers used during acquisition. Each set of seismic data includes seismic data acquired by a pair of over/under streamers. For example, seismic data from the first over/under streamer 11 and the second over/under streamer 12 may be grouped into a first data set. The seismic data from the first over/under streamer 11 and the third over/under streamer 13 may be grouped into a second data set. The seismic data from the second over/under streamer 12 and the third over/under streamer 13 may be grouped into a third data set.

The number of sets of seismic data may be determined according to $$\frac{n^2 - n}{2},$$

where n is the number of over/under streamers used during acquisition. Thus, if four over/under streamers were used to acquire the seismic data, then there would be six sets of seismic data that may be grouped based on each possible pair of over/under streamers.

Figure 3:
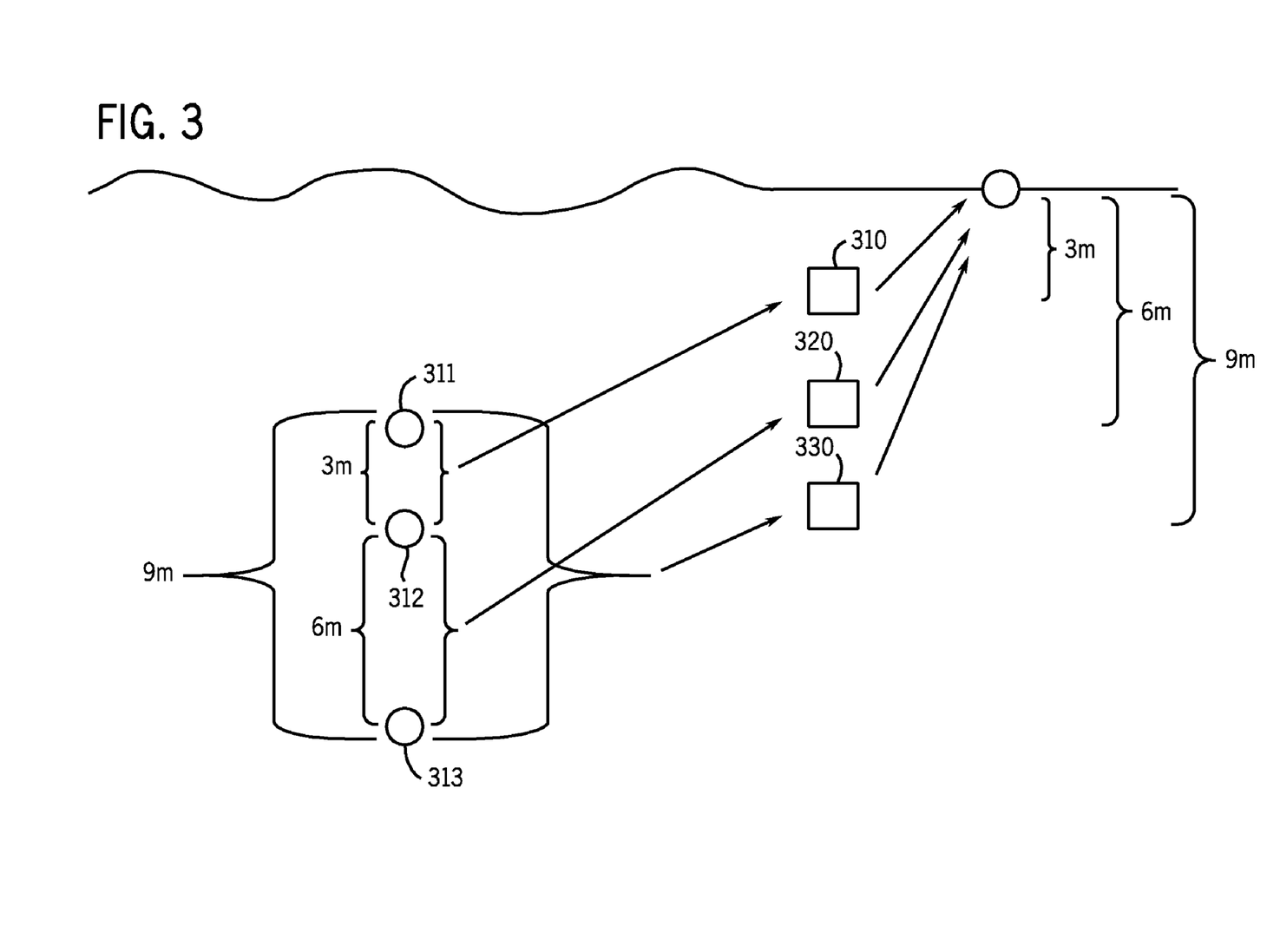
FIG. 3 illustrates a schematic diagram of how the seismic data may be processed in accordance with implementations of various techniques described herein.

At step 220, a shift and subtract algorithm may be applied to each set of seismic data. In one implementation, the shift and subtract algorithm may be expressed as:

$$D_{jl}(\omega, k_x, k_y) = e^{ik_z z_j} P(h\omega, k_x, k_y, z_l) - e^{ik_z z_l} P(\omega, k_x, k_z, z_j), j=1, \ldots n, l > j \quad \text{Equation (1),}$$

where $D_{jl}$ denotes the simulated data that would be recorded with a streamer at depth $z_l - z_j$ in a totally calm sea, i.e., without any rough sea surface perturbations, i denotes the index of the actual $i^{th}$ streamer, j denotes the index of the actual $j^{th}$ streamer from shallow to the deeper streamer depth, $\omega$ is the angular frequency and $P(\omega, k_x, k_y, z)$ denotes the recorded pressure wavefield at the depth of the corresponding streamers. As a result of applying the shift and subtract algorithm, each set of seismic data may be converted to a set of simulated seismic data that would have been acquired by a simulated single streamer disposed at a depth equivalent to the vertical separation between the over/under streamers of a given pair of the over/under streamers for that particular set of seismic data. The set of simulated seismic data would have been acquired in a totally calm sea having a flat sea surface. For example, the first set of simulated seismic data would have been acquired by a simulated single streamer 310 disposed at a depth of about 3 meters, which is the vertical separation between the first over/under streamer 311 and the second over/under streamer 312, as shown in FIG. 3. Likewise, the second set of simulated seismic data would have been acquired by a simulated single streamer 320 disposed at a depth of about 6 meters, which is the vertical separation between the second over/under streamer 312 and the third over/under streamer 313. The third set of simulated seismic data would have been acquired by a simulated single streamer 330 disposed at a depth of about 9 meters, which is the vertical separation between the first over/under streamer 311 and the third over/under streamer 313.

The shift and subtract algorithm may be configured to remove the rough sea effect from each set of seismic data. As such, the shift and subtract algorithm may be applied to remove the down going wave fields. However, in response to removing the down going wave fields, a simulated (or pseudo) ghost wavelet may be introduced to the data set. The simulated ghost wavelet may be equivalent to a ghost wavelet received by the simulated single streamer.

At step 230, a dephasing algorithm may be applied to each set of simulated seismic data. The dephasing algorithm may be configured to remove the simulated ghost wavelet by converting the simulated ghost wavelet to a zero phase simulated ghost wavelet. In one implementation, the dephasing algorithm may be expressed as:

$$D'_{jl}(\omega, k_x, k_y) = (e^{-ik_z(z_l - z_j)} - e^{ik_z(z_l - z_j)}) D_{jl}(\omega, k_x, k_y), j=1, \ldots n, l > j \quad \text{Equation (2),}$$

where $D_{jl}'$ denotes the dephased estimated streamer data at zero depth.

At step 240, a sum is computed for all the sets of simulated seismic data having zero phase simulated ghost wavelets. The sum may include simulated seismic data that would have been acquired by a single streamer disposed at zero depth. Further, the sum may include only simulated seismic data from up going wave fields. In one implementation, the summing operation may be performed according to the following algorithm:

$$\tilde{P}'(\omega, k_x, k_y, z = 0) = \sum_{j=1, \ldots, n, l > j} D'_{jl}(\omega, k_x, k_y) \quad \text{Equation (3),}$$

where the left hand side of the equation denotes a slightly distorted estimate of the up-going pressure wavefield at depth zero. Although the dephasing algorithm and the summing algorithm are described on separate steps, i.e., step 230 and step 240, it should be understood that in some implementations the dephasing algorithm and the summing algorithm may be performed as a single step. During the summing algorithm, the power spectra, i.e., squared amplitude spectra, of the simulated ghost wavelets may be summed, thereby filling in the corresponding frequency notches. As a result, however, a zero phase amplitude distortion may be generated.

Accordingly, at step 250, a normalization algorithm may be applied to the sum generated at step 240 to remove the residual zero phase amplitude distortion from the sum. In one implementation, the normalization algorithm may be expressed as:

$$\tilde{P}(\omega, k_x, k_y, z = 0) = \frac{\tilde{P}'(\omega, k_x, k_y, z = 0)}{\left( \sum_{j=1, \ldots, n, l > j} |1 - e^{2ik_z(z_l, z_j)}|^2 \right) + \varepsilon} \quad \text{Equation (4),}$$

The normalization algorithm may involve a spectral division; however, only with a single notch at zero-frequency, if the vertical separation between the streamers is properly selected. Division by zero may be avoided by adding a small amount $\varepsilon$ to the divisor. In this manner, various implementations described herein may be used to convert seismic data recorded from three or more over/under streamers into simulated seismic data that would have been acquired by a single streamer disposed at zero depth in a perfectly calm sea surface and wherein the simulated seismic data includes only data from up going wave fields.

As mentioned above, conventional twin streamer processing technology is typically based on the shift and subtract algorithm, and hence requires the vertical separation of the over/under streamers to be small, i.e., less than 6 m, to push the higher frequency notches of the remaining artificial ghost wavelet out of the seismic frequency band. With implementations of various techniques described herein, this vertical separation requirement may be relaxed, such that the over/under streamers may have a larger vertical separation. In one implementation, the vertical separation may not be constant or a multiple of a common separation interval to prevent the individual artificial ghost wavelets from sharing notch frequencies. Another advantage of various implementations described herein includes an improvement in signal-to-noise ratio at low frequencies over that of conventional twin streamer configuration.

Figure 4:
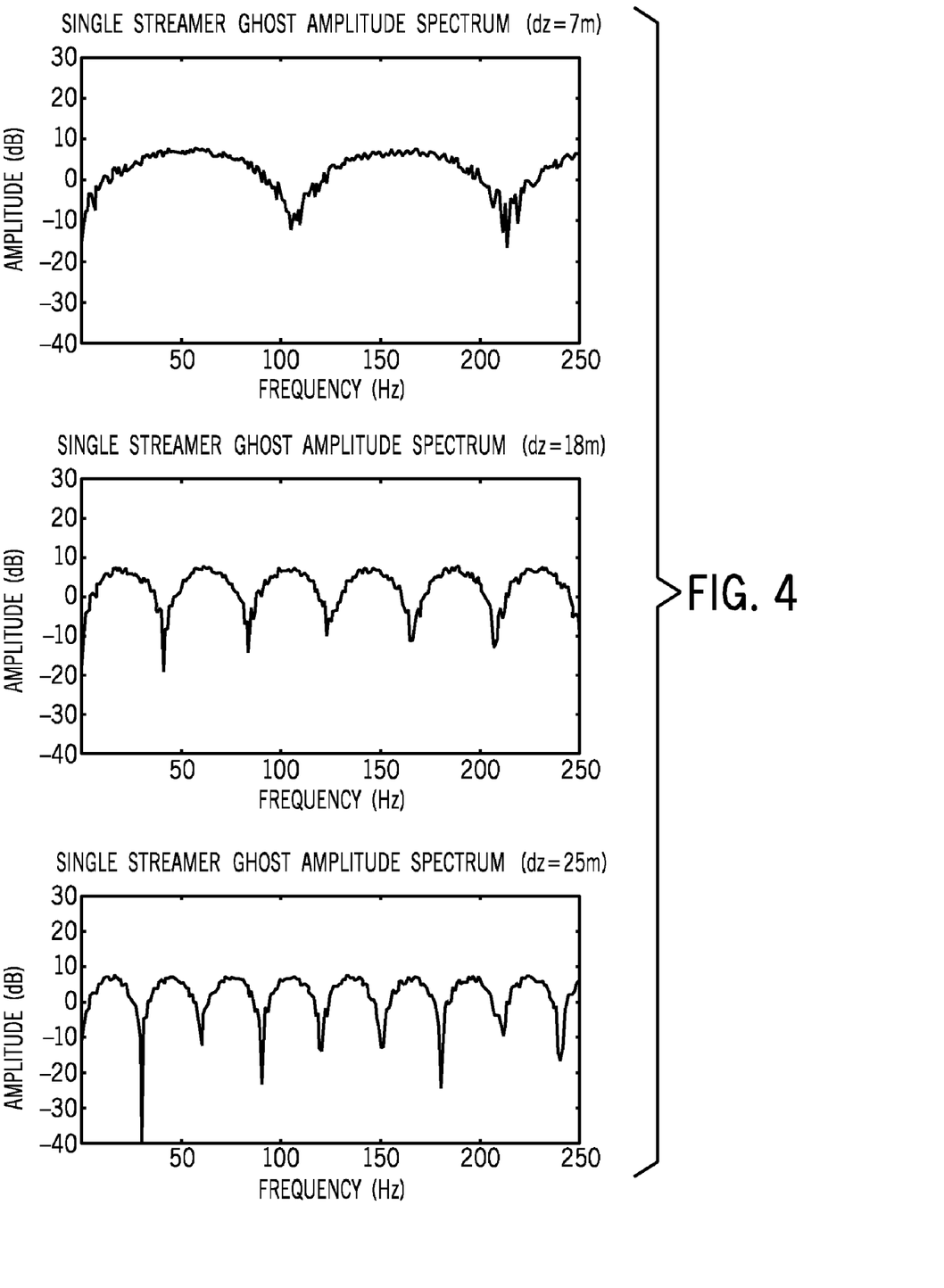
FIGS. 4-7 illustrate an example of processing seismic data in accordance with various implementations described herein.

FIGS. 4-7 illustrate an example of processing seismic data in accordance with various implementations described herein. FIG. 4 illustrates recorded seismic data from a triple over/under streamer configuration, with streamers at 7 meters, 18 meters and 25 meters depth. The recorded seismic data have been grouped according to their respective streamer depth from which they are acquired. For purposes of illustration, the recorded seismic data include simulated rough sea surface perturbations and simulated normal incidence ghost spectra.

Figure 5:
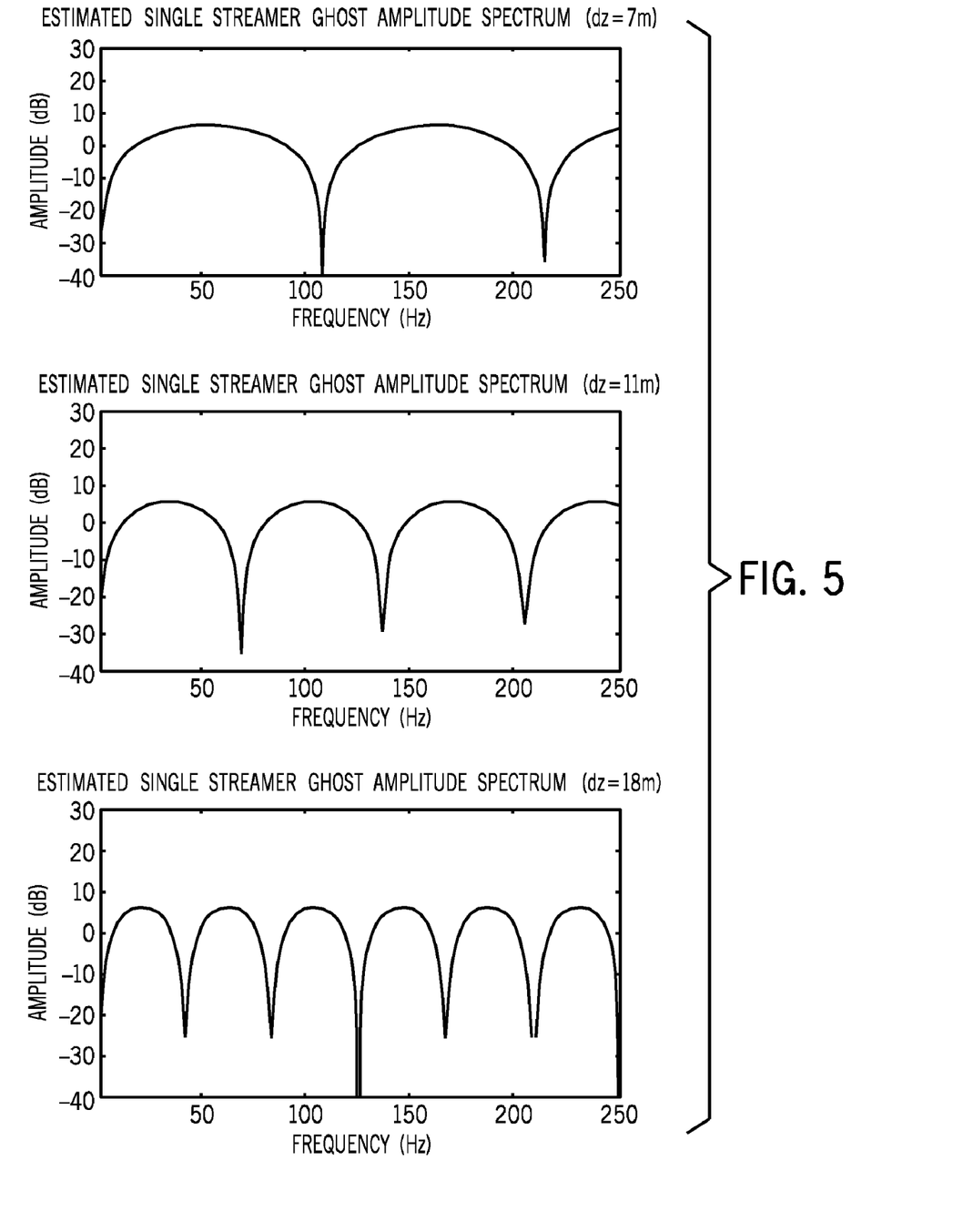

A shift and subtract algorithm, such as described in Equation (1), may then be applied to each group of seismic data. The output of the shift and subtract algorithm application includes: a first set of simulated seismic data that would have been acquired by an artificial single streamer at a depth of 7 meters, which is the vertical separation between the actual over/under streamer at a depth of 18 meters and the actual over/under streamer at a depth of 25 meters; a second set of simulated seismic data that would have been acquired by an artificial single streamer at a depth of 11 meters, which is the vertical separation between the actual over/under streamer at a depth of 7 meters and the actual over/under streamer at a depth of 18 meters; a third set of simulated seismic data that would have been acquired by an artificial single streamer at a depth of 18 meters, which is the vertical separation between the actual over/under streamer at a depth of 7 meters and the actual over/under streamer at a depth of 25 meters. FIG. 5 illustrates such simulated seismic data, which no longer shows any rough sea surface perturbations.

Figure 6:
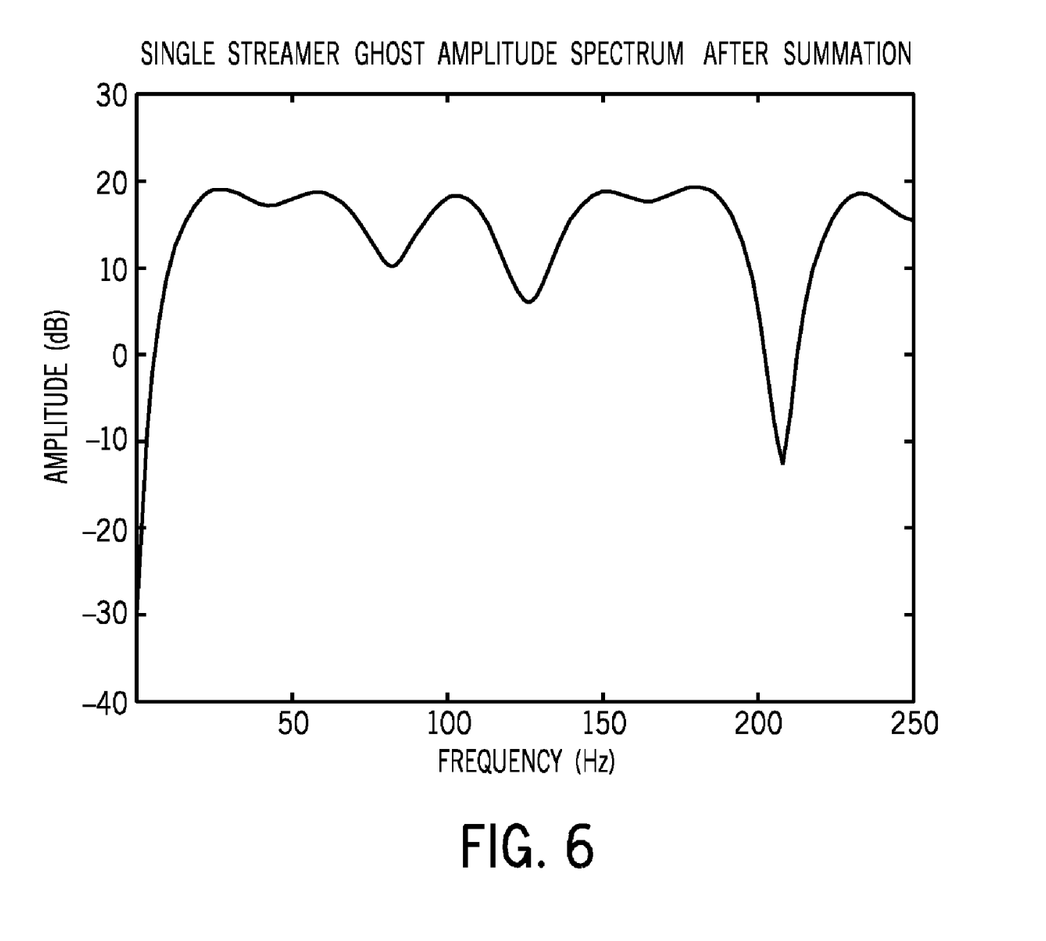

A dephasing and summing algorithm, such as described in Equations (2) and (3), may then be applied to the simulated seismic data. Such dephasing and summing algorithm application may yield an estimate of an up going wave at zero depth, showing a slight deviation from the ideal flat amplitude spectrum. FIG. 6 illustrates such an estimate of the up going wave at zero depth.

Figure 7:
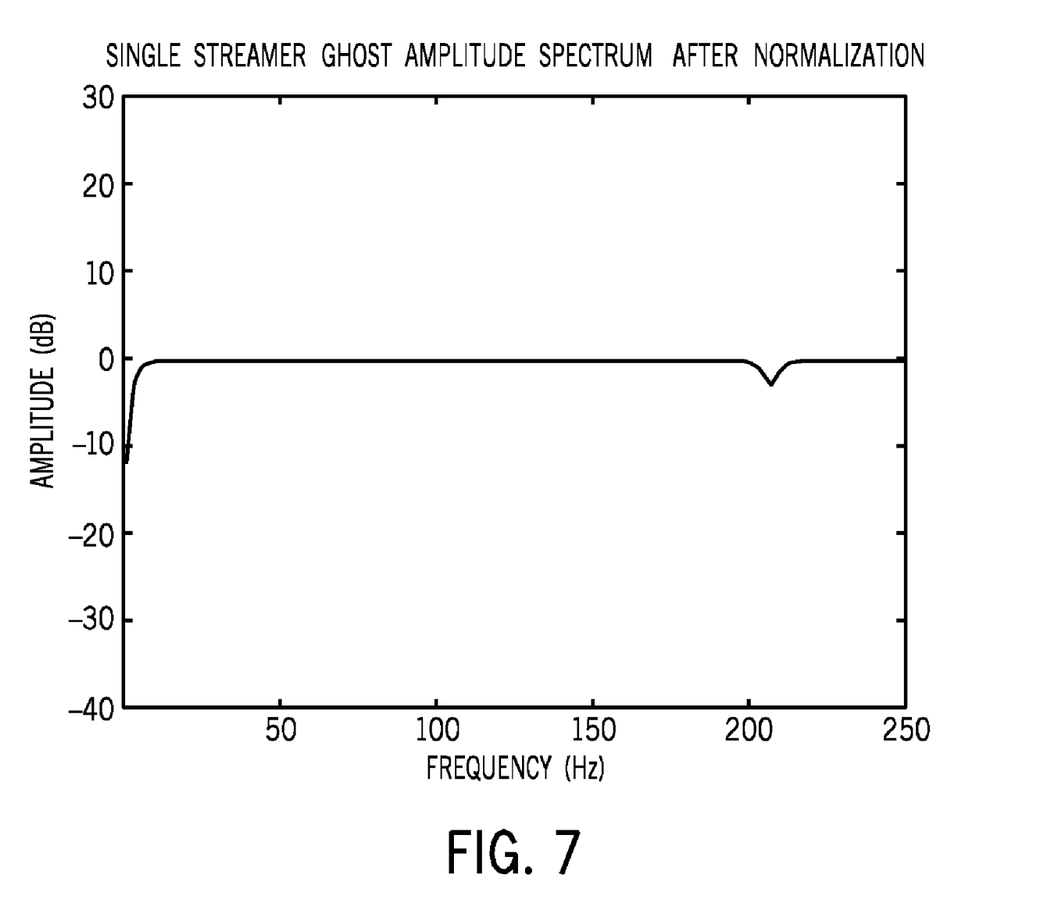

A normalization algorithm, such as described in Equation (4), may then be applied to the estimate of the up going wave at zero depth to generate an up going wave at zero depth without any distortions, which is illustrated in FIG. 7.

Figure 8:
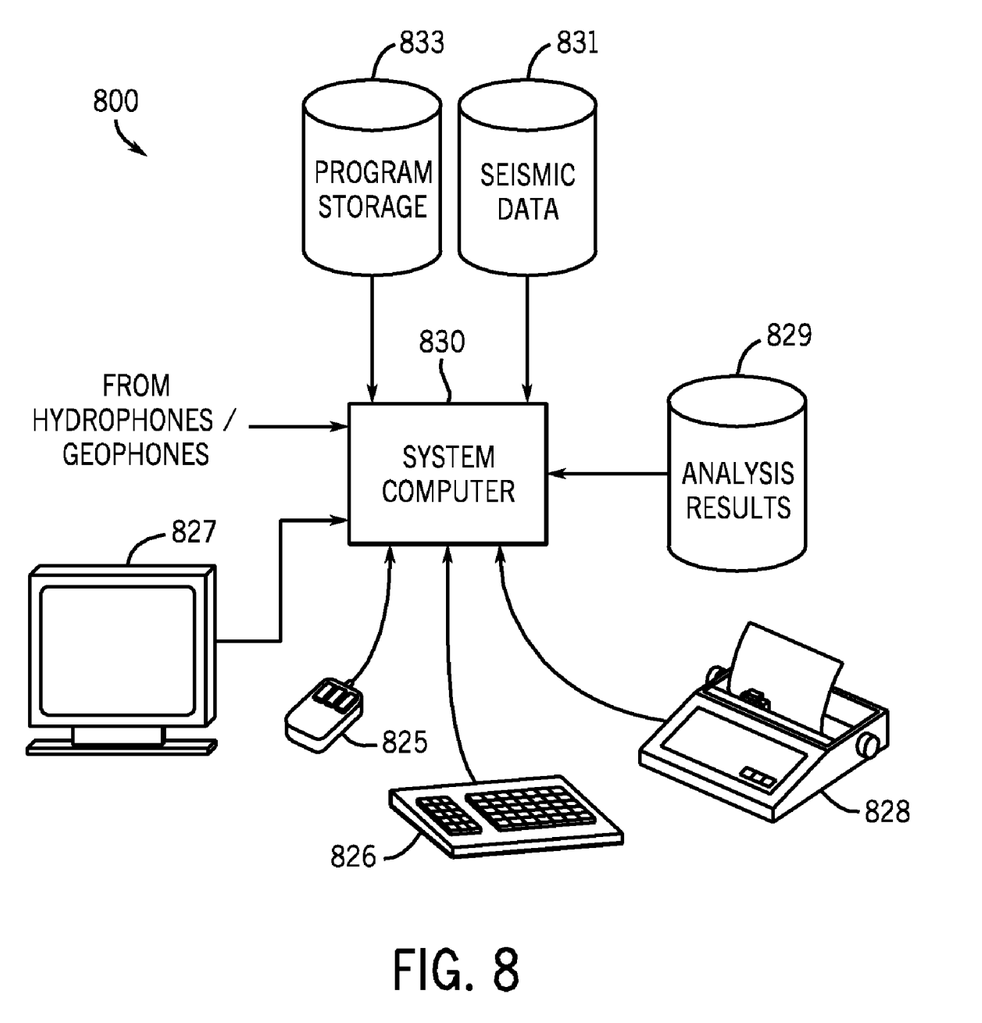
FIG. 8 illustrates a computer network into which implementations of various technologies described herein may be implemented.

FIG. 8 illustrates a computer network 800 into which implementations of various technologies described herein may be implemented. The computer network 800 may include a system computer 830, which may be implemented as any conventional personal computer or server. However, it should be understood that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 830 may be in communication with disk storage devices 829, 831, and 833, which may be external hard disk storage devices. It is contemplated that disk storage devices 829, 831, and 833 are conventional hard disk drives, and as such, will be implemented by way of a local area network or by remote access. Of course, while disk storage devices 829, 831, and 833 are illustrated as separate devices, a single disk storage device may be used to store any and all of the program instructions, measurement data, and results as desired.

In one implementation, seismic data from the receivers may be stored in disk storage device 831. The system computer 830 may retrieve the appropriate data from the disk storage device 831 to process seismic data according to program instructions that correspond to implementations of various technologies described herein. The program instructions may be written in a computer programming language, such as C++, Java and the like. The program instructions may be stored in a computer-readable memory, such as program disk storage device 833. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 830 may present output primarily onto graphics display 827, or alternatively via printer 828. The system computer 830 may store the results of the methods described above on disk storage 829, for later use and further analysis. The keyboard 826 and the pointing device (e.g., a mouse, trackball, or the like) 825 may be provided with the system computer 830 to enable interactive operation.

The system computer 830 may be located at a data center remote from the survey region. The system computer 830 may be in communication with the receivers (either directly or via a recording unit, not shown), to receive signals indicative of the reflected seismic energy. These signals, after conventional formatting and other initial processing, may be stored by the system computer 830 as digital data in the disk storage 831 for subsequent retrieval and processing in the manner described above. While FIG. 8 illustrates the disk storage 831 as directly connected to the system computer 830, it is also contemplated that the disk storage device 831 may be accessible through a local area network or by remote access. Furthermore, while disk storage devices 829, 831 are illustrated as separate devices for storing input seismic data and analysis results, the disk storage devices 829, 831 may be implemented within a single disk drive (either together with or separately from program disk storage device 833), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data acquired by three or more over/under streamers, comprising:
    pairing the seismic data into a plurality of sets of seismic data based on all possible pairs of the three or more over/under streamers, wherein each set of seismic data comprises seismic data that had been acquired by a distinct pair of the three or more over/under streamers;
    applying a shift and subtract algorithm to plurality of sets of seismic data; and
    applying a dephase and sum algorithm to the plurality of sets of seismic data.

2. The method of claim 1, wherein the plurality of sets of seismic data comprise a first set of seismic data that had been acquired by a first over/under streamer and a second over/under streamer, a second set of seismic data that had been acquired by a first over/under streamer and a third over/under streamer and a third set of seismic data that had been acquired by a second over/under streamer and a third over/under streamer.

3. The method of claim 1, wherein the plurality of sets of seismic data are determined according to $$\frac{n^2 - n}{2},$$

where n denotes the number of over/under streamers.

4. The method of claim 1, wherein applying the shift and subtract algorithm comprises generating one or more sets of simulated seismic data, wherein each set of simulated seismic data comprises seismic data that would have been acquired by a simulated single streamer disposed at a depth equivalent to a vertical distance between one of the pair of the three or more over/under streamers and the other one of the pair of the three or more over/under streamers and that would have been acquired in a calm sea having a flat surface.

5. The method of claim 2, wherein applying the shift and subtract algorithm comprises generating a first set of simulated seismic data that would have been acquired by a simulated single streamer disposed at a depth equal to a vertical distance between the first over/under streamer and the second over/under streamer in a sea having a flat surface.

6. The method of claim 5, wherein applying the shift and subtract algorithm comprises generating a second set of simulated seismic data that would have been acquired by a simulated single streamer disposed at a depth equal to a vertical distance between the second over/under streamer and the third over/under streamer in a sea having a flat surface.

7. The method of claim 6, wherein applying the shift and subtract algorithm comprises generating a third set of simulated seismic data that would have been acquired by a simulated single streamer disposed at a depth equal to a vertical distance between the first over/under streamer and the third over/under streamer in a sea having a flat surface.

8. The method of claim 4, wherein applying the dephase and sum algorithm comprises applying a dephase algorithm to remove a simulated ghost wavelet from each set of simulated seismic data, wherein the simulated ghost wavelet is generated in response to applying the shift and subtract algorithm.

9. The method of claim 8, wherein the dephase algorithm is configured to convert the simulated ghost wavelet to a zero phase simulated ghost wavelet.

10. The method of claim 4, wherein applying the dephase and sum algorithm comprises computing a sum of the one or more sets of simulated seismic data.

11. The method of claim 10, wherein the sum comprises seismic data that would have been acquired by a single streamer disposed at zero depth.

12. The method of claim 10, wherein the sum comprises seismic data only from up going wave fields.

13. The method of claim 10, further comprising normalizing the sum.

14. The method of claim 10, further comprising normalizing the sum to remove a zero phase amplitude distortion from the sum, wherein the zero phase amplitude distortion is generated in response to applying the dephase and sum algorithm.

15. A computer system, comprising:
    a processor; and
    a memory comprising program instructions executable by the processor to:
        pair seismic data acquired by at least one of three or more over/under streamers and three or more over/under sources into a plurality of sets of seismic data based on all possible pairs of the at least one of the three or more over/under streamers and three or more over/under sources, wherein each set of seismic data comprises seismic data that had been acquired by a distinct pair of the at least one of the three or more over/under streamers and three or more over/under sources;
        apply a shift and subtract algorithm to the plurality of sets of seismic data to generate one or more sets of simulated seismic data, wherein each set of simulated seismic data comprises seismic data that would have been acquired by one of a simulated single streamer and a simulated single source disposed at a depth equivalent to a vertical distance between one of the pair of the at least one of the three or more over/under streamers and three or more over/under sources and the other one of the pair of the at least one of the three or more over/under streamers and three or more over/under sources and that would have been acquired in a calm sea having a flat surface; and
        apply a dephase and sum algorithm to the one or more sets of simulated seismic data.

16. The computer system of claim 15, wherein the memory further comprises program instructions executable by the processor to apply a dephase algorithm to remove a simulated ghost wavelet from each set of simulated seismic data, wherein the simulated ghost wavelet is generated in response to applying the shift and subtract algorithm.

17. The computer system of claim 15, wherein the memory further comprises program instructions executable by the processor to compute a sum of the one or more sets of simulated seismic data.

18. A method for processing seismic data acquired using three or more over/under sources, comprising:
  pairing the seismic data into a plurality of sets of seismic data based on all possible pairs of the three or more over/under sources, wherein each set of seismic data comprises seismic data that had been acquired using a pair of the three or more over/under sources;
  applying a shift and subtract algorithm to the plurality of sets of seismic data; and
  applying a dephase and sum algorithm to the plurality of sets of seismic data.

19. The method of claim 18, wherein the plurality of sets of seismic data comprise a first set of seismic data that had been a first over/under source and a second over/under source, a second set of seismic data that had been acquired using first over/under source and a third over/under source and a third set of seismic data that had been acquired using a second over/under source and a third over/under source.

20. The method of claim 18, wherein applying the shift and subtract algorithm comprises generating one or more sets of simulated seismic data, wherein each set of simulated seismic data comprises seismic data that would have been acquired using a simulated single source disposed at a depth equivalent to a vertical distance between one of the pair of the three or more over/under sources and the other one of the pair of the three or more over/under sources and that would have been acquired in a calm sea having a flat surface.

21. The method of claim 20, wherein applying the dephase and sum algorithm comprises applying a dephase algorithm to remove a simulated ghost wavelet from each set of simulated seismic data, wherein the simulated ghost wavelet is generated in response to applying the shift and subtract algorithm.

22. The method of claim 20, wherein applying the dephase and sum algorithm comprises computing a sum of the one or more sets of simulated seismic data.

23. The method of claim 22, wherein the sum comprises seismic data that would have been acquired using a single source disposed at zero depth.

24. A method for processing seismic data acquired by three or more over/under streamers, comprising:
  combining seismic data acquired from a first over/under streamer and seismic data acquired from a second over/under streamer into a first set of seismic data;
  combining seismic data acquired from the first over/under streamer and seismic data from a third over/under streamer into a second set of seismic data;
  combining seismic data acquired from the second over/under streamer and the third over/under streamer into a third set of seismic data;
  applying a shift and subtract algorithm to the first, second and third sets of seismic data; and
  applying a dephase and sum algorithm to the first, second and third sets of seismic data.

* * * * *